United States Patent [19]

Harada et al.

[11] Patent Number: 4,708,032

[45] Date of Patent: Nov. 24, 1987

[54] TRANSMISSION CONTROL DEVICE HAVING SELECTABLE ROTATION SPEED DETECTOR

[75] Inventors: Yoshiharu Harada, Toyota; Yutaka Taga, Aichi; Kagenori Fukumura, Toyota; Yoichi Hayakawa, Toyoake; Masao Kawai, Chiryu, all of Japan

[73] Assignees: Toyota Jidosha Kabushiki Kaisha; Aisin-Warner Kabushiki Kaisha, both of Aichi, Japan

[21] Appl. No.: 820,074

[22] Filed: Jan. 21, 1986

[30] Foreign Application Priority Data

Jan. 19, 1985 [JP] Japan .................................. 60-7770

[51] Int. Cl.$^4$ ....................... B60K 41/18; F16H 37/00
[52] U.S. Cl. ..................................... 74/866; 180/247; 74/740
[58] Field of Search ................. 74/740, 869, 868, 867, 74/866; 180/247

[56] References Cited

U.S. PATENT DOCUMENTS

| | | | |
|---|---|---|---|
| 4,388,843 | 6/1983 | Teeter | 74/477 X |
| 4,411,174 | 10/1983 | Yokoi et al. | 74/866 |
| 4,444,073 | 4/1984 | Moroto et al. | 74/740 X |
| 4,466,502 | 8/1984 | Sakai | 180/247 |
| 4,484,654 | 11/1984 | Hayakawa | 74/867 X |
| 4,503,927 | 3/1985 | Hayakawa et al. | 180/247 |
| 4,552,036 | 11/1985 | Takamo et al. | 180/247 X |
| 4,561,325 | 12/1985 | Jester | 74/477 X |
| 4,582,159 | 4/1986 | Suzuki | 180/247 |
| 4,586,583 | 5/1986 | Yamakawa et al. | 180/247 |
| 4,592,442 | 6/1986 | Wilson et al. | 180/247 |

Primary Examiner—Leslie Braun
Assistant Examiner—Dirk Wright
Attorney, Agent, or Firm—Wegner & Bretschneider

[57] ABSTRACT

A transmission control device in accordance with the present invention for controlling a transmission system which is composed of a main transmission and a sub transmission, has a first rotational speed detector which is disposed on the input side of the sub transmission and a second rotational speed detector which is disposed on the output side of the sub transmission, and is characterized in that one rotational speed detector is employed while the sub transmission is in a speed changing state and the other rotational speed detector is employed while the sub transmission is not in a speed changing state, thereby performing system control.

The transmission control device which has the above described construction is equipped with the first rotational speed detector for detecting the rotational speed output of the main transmission (the rotational speed input of the sub transmission) and the second rotational speed detector for detecting the rotational speed of the output shaft of the sub transmission, whereby the speed range of one transmission is capable of being positively controlled even while the other transmission is in a speed changing state.

5 Claims, 8 Drawing Figures

TRANSMISSION CONTROL DEVICE HAVING SELECTABLE ROTATION SPEED DETECTOR

BACKGROUND OF THE INVENTION

The present invention relates to a transmission control device having a main transmission and a sub transmission.

A conventional type of transmission composed of a main transmission and a sub transmission employs a planetary gear in a speed change mechanism for the sub transmission, the input shaft of the sub transmission being coupled to a sun gear of the planetary gear and the output shaft of the sub transmission being coupled to a carrier of the same gear. The conventional transmission has a clutch for bringing the sun gear into and out of engagement with the carrier and a brake for stopping and releasing a ring gear of the planetary gear, whereby a direct coupling state is attained by engaging the clutch and disengaging the brake while a reduced speed state is attained by releasing the clutch and engaging the brake. Switching between the engagement and disengagement of the clutch and the brake is conducted by means of a manual shift valve which is manually operated and, additionally, the switching is conducted by distributing working oil to the hydraulic servomotor of each frictional engagement means for the brake and the clutch by utilizing a low-high switching valve which is controlled by a hydraulic pressure (governor pressure) in response to the rotational speed of the output of the main transmission. Shift control of the main transmission which serves as an automatic transmission is controlled in accordance with the throttle opening and the rotational speed of the output shaft of the main transmission.

Referring to one example of the conventional type of transmission described above, a sub transmission has a speed change mechanism in which frictional engagement means is switched between engagement and disengagement so as to set a variable speed. In this conventional type, during the transient state at the time of changing speeds such as the period of time from the disengagement of the clutch to the engagement of the brake or that from the disengagement of the brake to the engagement of the clutch, the input shaft of the sub transmission (=the output shaft of the main transmission) assumes a free state (a state wherein thereis no transfer of load), so that the shaft of the main transmission speed is not subjected to load. In this state, the ouput rotational speed unavoidably reaches a high revolution during the transient speed change state of the sub transmission, so that the shift control of the main transmission is effected in response to the rotational speed output of the main transmission. Therefore, the prior art transmission entails the risk of involving up shift during the transient speed change state of the sub transmission.

SUMMARY OF THE INVENTION

The present invention has been devised in light of the above described problems, and an object of this invention is to provide a transmission control device having a main transmission and a sub transmission which is capable of positively controlling the speed change in one transmission even when the other transmission assumes a transient state at the time of speed change.

Another object of the present invention is to avoid the problem which occurs when no load is applied to the output shaft of the main transmission and up-shift occurs during a transient speed change state such as the period of time from the disengagement of the clutch to the engagement of the brake or that from the disengagement of the brake to the engagement of the clutch.

Still other objects and advantages of the invention will in part be obvious and will in part be apparent from the specification.

The invention accordingly comprises the feartures fo construction, combinations of elements, and arranagement of parts which will be exemplified in the contruction hereinafter set forth, and the scope of the invention will be indicated in the claims.

In order to attain the above described objects, the transmission control device of the present invention composed of a main transmission and a sub transmission is equipped with a first rotational speed detecting means which is located on the input side of the sub transmission and a second rotational speed detecting means which is located on the output side of the same transmission, characterized in that system control is performed by employing one rotational speed detecting means while the sub transmission is in a speed changing state and by employing the other rotational speed detecting means while the sub transmission is not in a speed changing state.

The transmission control device of the present invention having the above described construction is equipped with the first rotational speed detecting means for detecting the rotational speed output of the main transmission (the rotational speed input of the sub transmission) and the second rotational speed detecting means for detecting the rotational speed of the output shaft of the sub transmission, whereby the speed range of one transmission is capable of being positively controlled even while the other transmission is in a speed changing state. Further, the transmission control device of the present invention has an electronic control mechanism for receiving signals from various sensors for sensing the running state of the vehicle and for determining the speed changing ratio, as well as for generating a control signal in the control of the speed changing mechanisms of the main and subtransmissions. Also, a speed changing mechanism driver is provided for operating the speed changing mechanisms of the main and subtransmissions in accordance with the control signals from the electronic controls. The speed changing mechanism driver has solenoid valves for the main and sub-hydraulic control devices for selectively engaging and disengaging frictional engagement elements in accordance with the energization and de-energization of the solenoid valves. Also, the electronic control sets the moment of commencement of the speed changing operation and the time required for the completion of the change of the speed changing ratio. The subtransmission is then judged whether it is in its transient period by detecting the time which has elapsed from the moment at which the speed changing operation is commenced.

DESCRIPTION OF THE PREFERRED EMBODIMENTS

The transmission control device of the invention will be fully understood from the following description of a preferred embodiment when the same is read in conjunction with the accompanying drawings.

Figure 1:
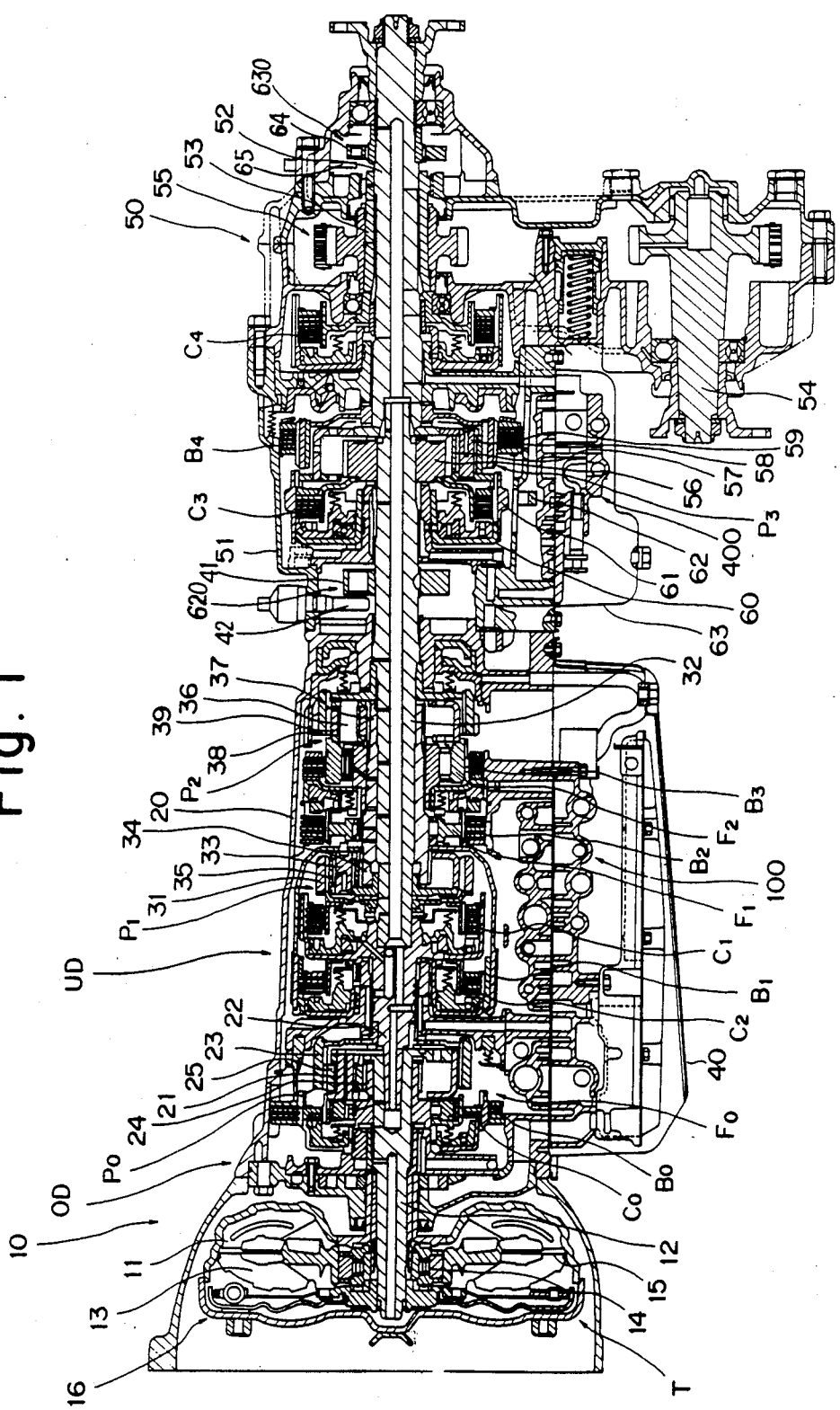
FIG. 1 is a sectional view of a four-wheel drive transmission in accordance with the present invention.
Figure 2:
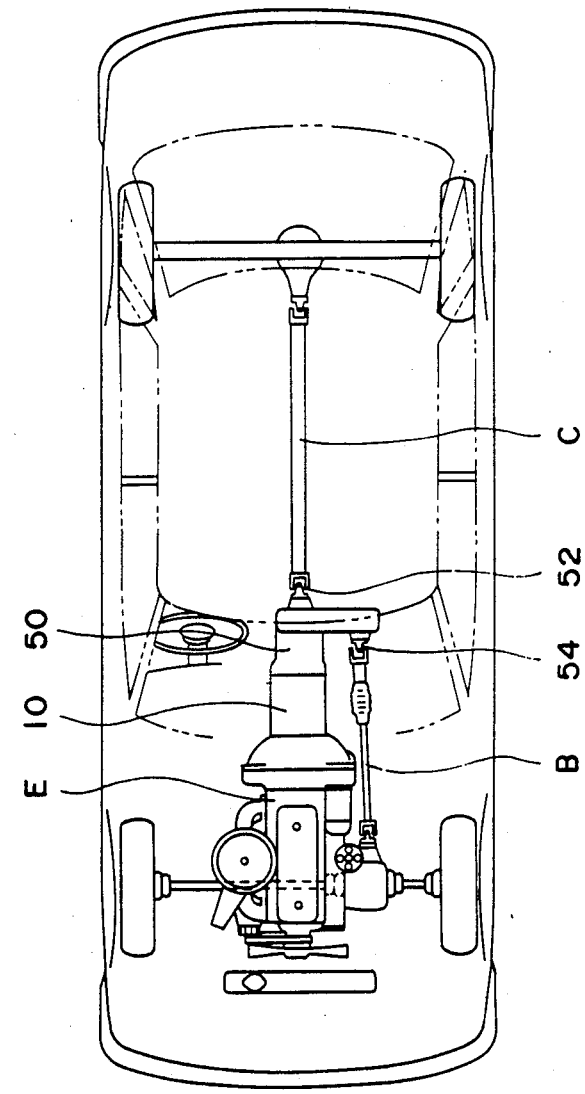
FIG. 2 is a schematic view of a drive mechanism for a four-wheel drive vehicle shown in FIG. 1.

FIG. 1 is a sectional view of a transmission system to which the present invention is applied, the transmission system being composed mainly of a four-speed automatic transmission having four forward speed gears and one reverse gear, and a four-wheel drive sub transmission. FIG. 2 schematically shows a four-wheel drive vehicle in which is mounted the transmission system shown in FIG. 1.

Referring first to FIG. 1, the transmission system includes a main transmission 10 which is a four-speed automatic transmission with an overdrive, and a four-wheel drive sub transmission 50 which is coupled to the output side of a planetary gear system incorporated in the main transmission 10. The main transmission 10 is directly mounted on an engine E and has an output shaft 32 which constitutes an input shaft of the four-wheel drive sub transmission 50. The sub transmission 50 has two output shafts: namely, a first output shaft 52 coupled to a rear-wheel drive propeller shaft C and a second output shaft 54 coupled to a front-wheel drive propeller shaft B.

The main transmission 10 is constituted by a fluid type torque converter T, an overdrive mechanism OD and an underdrive mechanism UD having three forward speed gears and one reverse gear.

The torque converter T has a pump impeller 11 coupled to the output shaft of the engine E, a turbine impeller 13 coupled to the output shaft 12 of the torque converter T, a stator 15 connected to a stationary part through a one-way clutch 14, and a direct clutch 16. The output shaft 12 of the torque converter T serves as the input shaft of the overdrive mechanism OD.

The overdrive mechanism OD includes frictional engagement means such as a multi-disc clutch C0, multi-disk brake B0 and a one-way clutch F0, and a planetary gear device P0. The planetary gear device P0 has various constituent parts which are brought into and out of engagement with other parts such as a stationary part, e.g., a main transmission case 20, input shaft, output shaft and other parts, in accordance with the respective states of selective engagement with the above-mentioned frictional engagement means.

More specifically, the planetary gear device P0 has a carrier 21 connected to the output shaft 12, a ring gear 23 connected to the output shaft 22 of the overdrive mechanism OD, a sun gear 24 rotatably carried by the input shaft 12 and fixed to the main transmission case 20 through the brake B0, the sun gear 24 being connected to the carrier 21 through the clutch C0 and also through the one-way clutch Fo paralled to the clutch C0 and planetary pinions 25 rotatably carried by the carrier 21 and held in meshing engagement with the sun gear 24 and the ring gear 23.

The output shaft 22 of the overdrive mechanism OD serves as the input shaft of the underdrive mechanism UD which has three forward speed gears and one reverse gear.

The underdrive mechanism UD has frictional engagement means such as multi-disc clutches C1 and C2, a belt brake B1, multi-disc brakes B2 and B3, one-way clutches F1 and F2, a primary planetary gear device P1 and a secondary planetary gear device P2.

The primary planetary gear device P1 includes a ring gear 31 connected to the output shaft 22 through the clutch C1, a carrier 33 connected to the output shaft 32 of the underdrive mechanism UD, a sun gear 34 connected to the output shaft 22 through the clutch C2 and fixed to the main transmission case 20 through the belt brake B1 and also through a series connection of the one-way clutch F1 and the brake B2 which is parallel to the brake B1 and planetary pinions 35 rotatably carried by the carrier 33 and held in meshing engagement with the sun gear 34 and the ring gear 31.

The secondary planetary gear device P2 includes a carrier 36 which is fixed to the main transmission case 20 through the brake B3 and also through the one-way clutch F2 parallel to the brake B3, a sun gear 37 formed integrally with the sun gear 34 of the primary planetary gear device P1, a ring gear 38 connected to the output shaft 32, and planetary pinions 39 rotatably carried by the carrier 36 and held in meshing engagement with the sun gear 37 and the ring gear 38.

A main hydraulic controller 100 is accommodated by an oil pan 40 connected to the underside of the main transmission case 10 and is provided at the underside thereof with an oil strainer 101. The main hydraulic controller 100 operates in accordance with various factors representing the state of running of the vehicle, e.g., throttle opening of the engine E, vehicle running speed and so forth, so as to selectively engage and disengage the clutches and brakes, thereby effecting gear change over four forward speed gears including the overdrive O/D and the reverse gear which is selected manually.

The sub transmission 50 has a sub transmission case 51 which is coupled to the rear end of the main transmission case 20 by means of a plurality of bolts, such that the output shaft 32 of the main transmission 10 constitutes the input shaft of the sub transmission 50. More specifically, the sub transmission 50 has frictional engagement means such as a clutch C3, a brake B4 and a clutch C4 which are driven by the input shaft constituted by the common output shaft of the planetary gear devices P1 and P2. The sub transmission 50 has a first output shaft 52 connected in series to the output shaft 32, a planetary gear device P3 interposed between the output shaft 32 and the first output shaft 52, a four-wheel drive sleeve 53 rotatably fitted around the first output shaft 52, a second output shaft 54 disposed in parallel with the output shaft 32 and projecting in the direction opposite to the first output shaft 52, and a transfer mechanism 55 through which the sleeve 53 is connected to the second output shaft 54. The planetary gear device P3 includes a sun gear 56 splined to the end of the output shaft 32, planetary pinions 57 meshing with the sun gear 56, a ring gear 58 meshing with the planetary pinions 57, and a carrier 59 rotatably carrying the planetary pinions 57 and connected to the free end of the first output shaft 52 of the sub transmission 50. A parking gear 61 is formed on the outer peripheral surface of cylinder 60 which is connected to the carrier 59. The arrangement is such that, when a shift lever (not shown) of the main transmission 10 is operated to select a parking position, a stopper 62 engaged with the parking gear 61 thereby fixing the first output shaft 52.

The frictional engagement means, i.e., clutches and brakes, of the sub transmission 50 are selectively operated to be engaged and disengaged by a sub hydraulic controller 400 which is disposed in an oil pan 63 under the sub transmission case 51.

The sub transmission case 51 for the sub transmission 50 is coupled to the rear end of the main transmission case 20 for the main transmission 10. A rotor 41 into which a permanent magnet is incorporated is secured to the periphery of the output shaft 32 of the main transmission 10 extending into the rear end of the sub transmission case 51 by means of a woodruff key, a snap ring and so forth. A reed switch 42 is disposed adjacent to the side of the rotor 41 which faces the main transmission 10 and is tightly mounted to the sub transmission case 51 in such a manner that the reed switch 42 is kept out of contact with the rotor 41. The reed switch 42 is arranged to be energized in a state wherein the permanent magnet contained in the rotor 41 is near the switch 42 and to be de-energized in a state wherein the same magnet is separated from the switch 42 to thereby generate pulses, and is connected to a computer 600 later to be described. Thus, the rotor 41 and the reed switch 42 constitute a first rotational speed detecting means 620 for detecting the rotational speed of the output shaft 32 of the main transmission 10 in response to the pulses generated by the reed switch 42. On the other hand, in the same manner as the first rotational speed detecting means 620, a rotor 64 into which a permanent magnet is incorporated is secured to the periphery of the first output shaft 52 of the sub transmission 50 extending into the rear portion (extension housing) of the sub tranmission case 51 for the sub transmission 50 by means of a woodruff key, a snap ring and so forth. A reed switch 65 is disposed adjacent to the side of the rotor 64 which faces the transfer mechanism 55 and is tightly mounted to the sub transmission case 51 in such a manner that the reed switch 65 is kept out of contact with the rotor 64. The reed switch 65 is arranged to be energized in a state wherein the permanent magnet contained in the rotor 64 is near the switch 65 and to be de-energized in a state wherein the same magnet is separated from the switch 65, and is connected to the computer 600. Thus, the rotor 464 and the reed switch 65 constitute a second rotational speed detecting means 630 for detecting the rotational speed of the output shaft 52 of the sub transmission 50 in response to the pulses generated by the reed switch 65.

Figure 3:
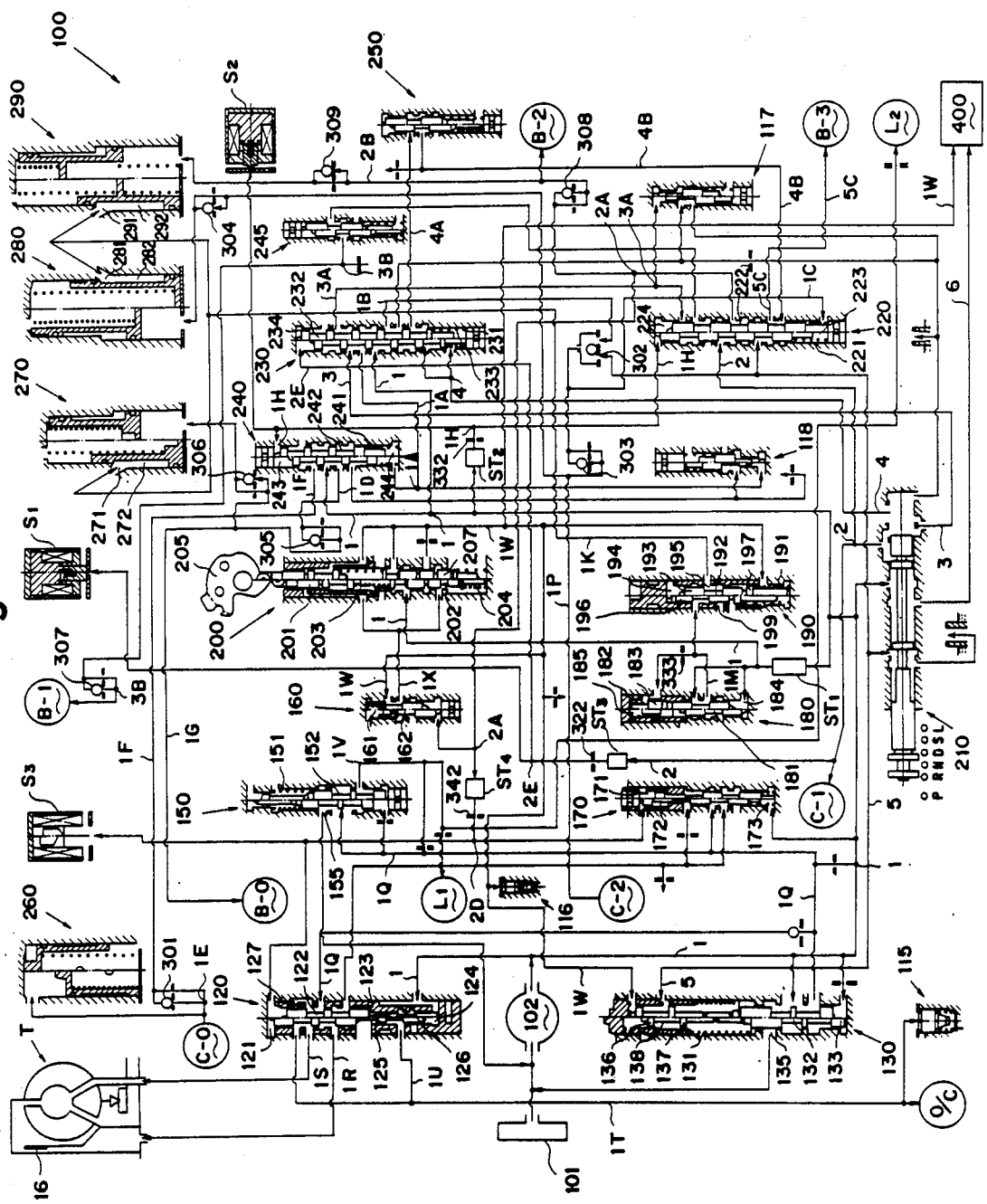
FIG. 3 is a diagram showing a hydraulic circuit for a hydraulic controller used in the main transmission in accordance with the present invention.

FIG. 3 shows the detail of the main hydraulic controller 100 for controlling the main transmission 10.

As will be seen from this Figure, the main hydraulic controller 100 has the following parts: an oil strainer 101; an oil pump 102; a cooler by-pass valve 115 for regulating the oil pressure in an oil cooler O/C; a pressure relief valve 116; a release clutch control valve 117; a release brake control valve 118; a lock-up relay valve 120; a pressure regulator valve 130 for regulating the pressure of a working fluid or oil which is supplied by the oil pump 102 to an oil passage 1; a second pressure regulator valve 150 through which the oil is supplied both to a lubricating oil supply passage L1 leading to the main transmission 10 and a working oil supply passage L2 for the sub transmission 50; a cut-back valve 160; a lock-up control valve 170; a first accummulator control valve 180; a second accummulator control valve 190; a throttle valve 200; a manual valve 210 which distributes the line pressure in the oil passage 1 selectively to oil passages 2 to 6; a 1-2 shift valve 220; a 2-3 shift valve 230; a 3-4 shift valve 240; an intermediate coast modulator valve 245 which regulates the pressure of the oil supplied to the brake B1; a low coast modulator valve 250 for regulating the pressure of the oil supplied to the hydraulic servomotor B-3; an accummulator 260 for smoothing the engagement of the clutch C0; an accummulator 270 for smoothing the engagment of the brake B0; and accummulator 280 for smoothing the engagement of the clutch C2; an accummulator 290 for smoothing the engagement of the brake B2; hydraulic servomotors C-0, C-1 and C-2 for the clutches C0, C1 and C2; hydraulic servomotors B-0, B-1, B-2 and B-3 for the brakes B0, B1, B2 and B3; flow-rate control valves for controlling the flow rates of oil flowing therethrough, the flow-rate control valves being respectively denoted by 301, 303, 304, 305, 306, 307, 308 and 309 and provided with respective check valves; a shuttle valve 302; oil strainers ST1, ST2, ST3 and ST4; a first solenoid valve S1 adapted for controlling the 2-3 shift valve 230 under the control of a later-mentioned electronic controller or computer 600; a second solenoid valve S2 adapted for controlling both the 1-2 shift valve 220 and the 3-4 shift valve 240 under the control of the computer 600; a third solenoid valve S3 adapted to control both the lock-up relay valve 120 and the lock-up control valve 170 under the control of the computer 600; and oil passages providing communication between the valves and the hydraulic cylinders of respective clutches and brakes.

The working oil is sucked by the hydraulic pump 102 from the oil pan 40 through an oil strainer 101, and is supplied to the oil passage 1 at a predetermined line pressure regulated by the pressure regulator valve 130.

The pressure regulator valve 130 has a spool 132 which is urged by a spring 131 disposed on the upper side thereof as viewed in FIG. 3, and a plunger 138 disposed in series with and incontact with the spool 132. In operation, a throttle pressure introduced through an oil passage 1W and acting on the uppermost land 136 of the plunger 138 produces a force which, together with the force produced by the spring 131, acts to cause a downward displacement of the spool 132. When reversing, downward force is produced also by the line pressure introduced through the oil passage 5 and acting on the lowermost land 137 of the plunger 138, in addition to the downward force produced by the throttle pressure and the spring 131. On the other hand, the line pressure is fed back to the lowermost land 133 of the spool 132 so as to produce a force which acts to displace the spool 132 upwardly. In consequence, the spool 132 is displaced to a position where the upward force and the downward force balance each other, so as to change the area of communication between the oil passage 1 and the oil passage 1Q, as well as the area of communication between the oil passage 1 and the drain port 135, thereby maintaining the line pressure at a level corresponding to the state of running of the vehicle.

The throttle valve 200 has a throttle plunger 201 which is adapted to be displaced by a cam 205 which in turn is rotated in accordance with the amount by which the accelerator pedal is depressed. The throttle valve 200 also has a spool 202 disposed on the lower side of the throttle plunger 201 as viewed in FIG. 3 with a spring 203 acting as an intermediary therebetween. The stroking of the throttle plunger 201 causes an axial movement of the spool 202 through the action of the spring 203 so that the spool 202 changes the line pressure supplied from the oil passage 1 to the throttle pressure corresponding to the throttle opening and delivers the throttle pressure to the oil passage 1W.

The second pressure regulator valve 150 has a spool 152 which is urged by a spring 151 acting on the upper side thereof as viewed in FIG. 3. The spool 152 is axially displaced to a position where a balance is obtained between the downward force exerted by the spring 151 and an upward force which is generated by an oil pressure fed back through the oil passage 1Q and acting on the lower side thereof, thus varying the area of communication between the oil passage 1Q and the lubricating oil supply passage 1V, as well as the area of communication between the oil passage 1Q and the drain port 155, thereby regulating the pressure in the oil passage 1Q to a predetermined secondary line pressure (torque converter pressure), while delivering excessive oil to the oil passage 1V. The oil supplied to the oil passage 1V is distributed both to the lubricating oil passage L1 of the main transmission 10 and the working oil supply passage L2 leading to the sub transmission 50.

The manual valve 210 is directly connected to the shift lever arranged in the vicinity of the driver's seat, and is adapted to take one of the positions P (parking), R (reverse), N (neutral), D (drive), S (second) and L (low) as the shift lever is manually operated such as to select one of the modes P, R, N, D, S and L.

The first solenoid valve S1, when not energized, blocks the oil passage 2E which is communicated with the oil passage 2 through an orifice 322. In this state, a solenoid pressure of high level equal to that of the line pressure is maintained in the oil passage 2E. However, when energized, the first solenoid valve S1 allows the oil passage 2E to communicate with the drain, so that the solenoid pressure in the oil passage 2E is reduced to a low level.

Similarly, the second solenoid valve S2 operates, when not energized, to establish a high solenoid pressure in the oil passage 1H which communicates with the oil passage 1 through an orifice 332 and, when energized, to drain the oil in the oil passage 1H thereby reducing the solenoid pressure to a low level.

The third solenoid valve S3 controls the pressure in an oil chamber 121 which is formed on the upper side of the lock-up relay valve 120 as viewed in FIG. 3 and connected to the oil passage 2D which in turn is communicated with the oil passage 2A through an orifice 342. The third solenoid valve S3 also controls the pressure in an oil chamber 171 which is formed on the upper side of the lock-up control valve 170 as viewed in FIG. 3. More specifically, the third solenoid valve S3 operates, when energized, to establish a high solenoid pressure in the oil chambers 121 and 171 thereby displacing the spools 122 and 172 downwardly as viewed in FIG. 3, whereas, when de-energized, it allows the oil chambers 121 and 171 to be drained so as to reduce the solenoid pressure to a low level, thereby allowing the spools 122 and 172 to return to the upper positions by virtue of the force produced by the line pressure derived from the oil passage 1 and the forces of the springs 123 and 173.

The 1-2 shift valve 220 has a spool 222 which is urged by a spring 221 acting on the lower side thereof as viewed in FIG. 3. When the solenoid pressure of high level is maintained in the oil passage 1H by the second solenoid valve S2 which is not energized, this high solenoid pressure is introduced into an oil chamber 224 which is defined on the upper side of the 1-2 shift valve 220, so that the spool 222 is moved downwardly to a first speed position. Conversely, when the second solenoid valve S2 is energized to drain the oil passage 1H and thereby to reduce the solenoid pressure to the low level, the spool 222 is returned to the upper position, away from the first speed position. When a third speed or a fourth speed is selected, the line pressure is introduced into an oil chamber 223 which is formed on the lower side of the spool 222 through the oil passage 1, 2-3 shift valve 230 and then through the oil passage 1C which is communicated with the oil passage 1B, so that the spool 222 is held at the upper position regardless of the level of the solenoid pressure.

The 2-3 shift valve 230 has a spool 232 urged by a spring 231 acting on the lower side thereof as viewed in FIG. 3. When the first solenoid valve S1 is energized, the solenoid pressure in the oil passage 2E takes the low level, so that the spool 232 is held by the force of the spring 231 at an upper position, as viewed in FIG. 3, where it serves for first and second speeds, as well as for reversing. Conversely, when the first solenoid valve S1 is not energized, the high solenoid pressure established in the oil passage 2E is applied to an oil chamber 234 so as to produce a force which acts to displace the spool 232 downwardly, as viewed in FIG. 3, to a lower position where it serves for the third speed and fourth speed operations. However, when the line pressure is supplied to an oil chamber 233 which is formed on the lower side of the spool 232, the spool 232 is fixed at the upper position regardless of the level of the solenoid pressure.

The 3-4 shift valve 240 has a spool 242 which is urged by a spring 241 acting on the lower side thereof. When the second solenoid valve S2 is not energized, the solenoid pressure of the high level is introduced through the oil passage 1H into an oil chamber 243 on the upper side of the spool 242, so that the spool 242 is held at a lower position as viewed in FIG. 3 where it serves for fourth speed (overdrive) operation. In contrast, when the second solenoid valve S2 is energized, the oil passage 1H is drained so that the spool 242 is set at an upper position where it serves for operations other than that for the fourth speed. When the line pressure is fed to an oil chamber 244 defined on the lower side of the spool 242 from the oil passage 1 or the oil passage 3 via the 2-3 shift valve 230 and the oil passage 1A, the spool 242 is fixed at the upper position by the force generated by the line pressure and the force of the spring 241.

The cut-back valve 160 has a spool 162 which is displaced by a downward force exerted by a spring 161 and an upward force produced by the line pressure introduced through the oil passage 2A. More specificatlly, when the line pressure is supplied through the oil passage 2A, the spool 162 is set at the upper position as viewed in FIG. 3 so as to bring the oil passage 1X into communication with the oil passage 1W which maintains the throttle pressure mentioned before, thereby outputting the throttle pressure as the cut-back pressure which is applied to the lower land 207 of the spool 202 of the throttle valve 200, thereby reducing the level of the throttle pressure in the oil passage 1W. The reduction in the throttle pressure causes the spool 132 of the pressure regulator valve 130 to move upwardly, thereby allowing the line pressure in the oil passage 1 to be relieved through a drain port 135, thus effecting a so-called "cut-back" of the line pressure.

The first accummulator control valve 180 has a spool 181 disposed at a lower portion thereof as viewed in FIG. 3, and a plunger 183 connected in series to the spool 181 and downwardly urged by a spring 182. In operation, the spool 181 is axially displaced so as to attain a balance between an upward force produced by the line pressure introduced into a lower oil chamber 184 through the oil passage 1 and a downward force which is the sum of the force of the spring 182 and the force produced by the output pressure fed back from the oil passage 1M to an upper oil chamber 185 through an orifice 333, thereby producing the output pressure through regulating the line pressure which is transmitted from the oil passage 1. The thus obtained output pressure is delivered to the second accummulator control valve 190 through the oil passage 1M.

The second accummulator control valve 190 has a spool 192 which is urged by a spring 191 acting on the lower side thereof. The spool 192 has an upper land 193 in which is formed an orifice 196 which provides communication between an upper oil chamber 194 formed on the upper side of the spool 192 and an intermediate oil chamber 195 formed under the land 193. The spool 192 is axially displaced upon balance being attained between an upward force which is the sum of the force exerted by the spring 191 and the force produced by a throttle modulator pressure which acts on a lower land 197 of the spool 192 through the oil passage 1W, and a downward force which is produced by a feedback pressure from the oil passage 1M to act in the upper oil chamber 194 through the orifice 196, thereby producing an output pressure at the oil passage 1M. The output pressure from the oil passage 1M is supplied through the oil passage 1K to back-pressure chambers 272, 282 and 292 of the accumulators 270, 280 and 290 through respective back-pressure ports 271, 281 and 291, thereby controlling the back pressure in these accummulators. The back pressure in turn is applied through the oil passage 1K to the upper land 193 of the spool 192, so that the latter is displaced downwardly as viewed in FIG. 3, thereby allowing the oil passage 1K to be communicated with a drain port 199 through an intermediate oil chamber 195, whereby the back pressure in the oil passage 1K is relieved.

As stated before, the manual valve 210 is operated manually by means of the shift lever (not shown) of the main transmission 10 disposed in the vicinity of the driver's seat. The shift lever is adapted to be operated manually by the driver so as to take one of the ranges P (parking), R (reverse), N (neutral), D (drive), S (second) and L (low) of the main shift position Mp. Table 1 shows the gear stages, i.e., the fourth (4), third (3), second (2) and first (1) gears obtainable in the respective ranges of the main shift position Mp, as well as the states of clutches and brakes corresponding to the respective gear stages.

TABLE 1

| Mp | S1 | S2 | S3 | C1 | C2 | C0 | B1 | B2 | B3 | B0 | F1 | F2 | F3 |
|---|---|---|---|---|---|---|---|---|---|---|---|---|---|
| P | O | X | X | X | X | E | X | X | X | X | f | f | f |
| R | O | X | X | X | E | E | X | X | E | X | f | f | f |
| N | O | X | X | X | X | E | X | X | X | X | f | f | f |
| D | O | | | | | | | | | | | | |
| 1 | O | X | X | E | X | E | X | X | X | X | f | L | (L) |

TABLE 1-continued

| Mp | S1 | S2 | S3 | C1 | C2 | C0 | B1 | B2 | B3 | B0 | F1 | F2 | F3 |
|---|---|---|---|---|---|---|---|---|---|---|---|---|---|
| 2 | O | O | O | E | X | E | X | E | X | X | L | f | (L) |
| 3 | X | O | O | E | E | E | X | E | X | X | f | f | (L) |
| 4 | X | X | O | E | E | X | X | E | X | E | f | f | f |
| S | | | | | | | | | | | | | |
| 1 | O | X | X | E | X | E | X | X | X | X | f | L | (L) |
| 2 | O | O | O | E | X | E | E | E | X | X | (L) | f | (L) |
| 3 | X | O | O | E | E | E | X | E | X | X | f | f | (L) |
| (3) | X | X | X | E | E | E | X | E | X | X | f | f | (L) |
| L | | | | | | | | | | | | | |
| 1 | O | X | X | E | X | E | X | X | E | X | f | (L) | (L) |
| 2 | O | O | X | E | X | E | E | E | X | X | (L) | f | (L) |
| (1) | X | X | X | E | X | E | X | X | E | X | f | (L) | (L) |

In table 1, marks O and X represent the fact that the solenoid valves S1 and S2 are energized and de-energized, respectively, whereas the mark O shows that the solenoid valve S3 is energized to lock-up the transmission. The mark X appearing in the column of the solenoid valve S3 indicates that the solenoid valve S3 is de-energized to release the lock-up state. Symbol E shows that the clutches and the brakes are engaged, while the symbol X in the columns of clutches and brakes indicate that the clutches and brakes are released. A symbol L indicates that the one-way clutch is in the engaged state when the power is transmitted from the engine even through the power transmission is ensured also by a clutch or a brake connected in parallel with this one-way clutch, i.e., it indicates that the one-way clutch is locked. A symbol (L) shows that the one-way clutch is engaged only in the engine driving condition but is disengaged in the engine braking condition. Finally, a symbol f indicates that the clutch is in the free state.

Table 2 shows the states of communication between the oil passage 1 and the oil passages 2 to 6, as obtained in the respective positions of the shift lever of the main transmission 10.

TABLE 2

|  | P | R | N | D | S | L |
|---|---|---|---|---|---|---|
| Oil passage 2 | X | X | X | O | O | O |
| Oil passage 3 | X | X | X | X | O | O |
| Oil passage 4 | X | X | X | X | X | O |
| Oil passage 5 | X | O | X | X | X | X |
| Oil passage 6 | X | O | O | O | O | O |

In Table 2, a mark O shows establishment of the communication that allows delivery of the line pressure to the respective oil passages, whereas a mark X indicates that the respective oil passages are drained.

The operation of the main hydraulic controller 100 in response to the manual shifting operation of the manual valve 210 will be explained hereinunder.

When Manual Valve 210 Selects N or P Range

In this state, the oil passage 1 communicates with none of the oil passages 2 to 5, as will be seen from Table 2, and the first and second solenoid valves S1 and S2 are energized and de-energized, respectively, as shown in Table 1. The spool 222 of the 1-2 shift valve 220 is therefore displaced to the lower position by the force produced by the high level solenoid pressure, while the spool 232 of the 2-3 shift valve 230 takes the upper position under the force of the spring 231, thus allowing the line pressure to be supplied from the oil passage 1A to the lower oil chamber 244 of the 3-4 shift valve 240 and thereby upwardly displacing the spool 242 of the 3-4 shift valve 240. In this state, only the servomotor C-0 of the clutch C0 is communicated with the oil passage 1 through the 3-4 shift valve 240, oil passagew 1F, flow-rate control valve 301 with check valve, and the oil passage 1E, while detouring the manual valve 210, so that only the clutch C0 is engaged.

When Manual Valve 210 Selects D Range

In this state, the line pressure is supplied to the oil passage 2, so that the clutch C1 is engaged.

The vehicle then starts with the first speed gear. Namely, when the D range is selected, the first solenoid valve S1 and the sencond solenoid valve S2 are energized and de-energized, respectively, as shown in table 2, so that the spool 222 of the 1-2 shift valve 220 takes the lower position. In this state, the oil passages 3B and 2A leading to the brakes B1 and B2 are drained, and the oil passage 5C leading to the brake B3 is not supplied with oil, so that the brakes B1, B2 and B3 are released. At the same time, since the spool 232 of the 2-3 shift valve 230 is set at the upper position, the oil passage 1B is drained and the clutch C0 thereby disengaged. Meanwhile, the line pressure is supplied from the oil passage 1A to the lower oil chamber 244 of the 3-4 shift valve 240, so that the spool 242 is held at the upper position such as to maintain the clutch C0 in the engaged state by the oil pressure which is supplied from the oil passage 1 through the 3-4 shift valve 240 and the oil passage 1F. On the other hand, the oil passage 1B is drained so that the clutch C2 is disengaged and the brake B0 is released because the oil passage 1D is drained as a result of the supply of the line pressure to the oil passage 1F. In consequence, the power train is completed with the first speed gear, thereby starting the vehicle with the first speed gear.

Up-shift to the second speed gear is conducted in accordance with the state of running of the vehicle, in a manner which will be explained hereinunder.

When the vehicle running speed has reached a predetermined level, the computer 600 produces an output which allows the second solenoid valve S2 to be energized, so that the solenoid pressure acting in the upper oil chamber 224 of the 1-2 shift valve 220 is reduced to the low level, thereby causing the spool 222 of the 1-2 shift valve 220 to be moved upward, whereby the oil is supplied to the servomotor B-2 of the brake B2 from the oil passage 2, 1-2 shift valve 220, oil passage 2A, flow-rate control valve 308 with check valve, and the oil passage 2B, thus engaging the brake B2 and accomplishing the up-shift to the second speed gear.

As the vehicle speed is further increased, an up-shift to the third speed gear is effected in the following way. Namely, the computer 600 produces an output which serves to de-energize the first solenoid valve S1 so that the spool 232 of the 2-3 shift valve 230 is moved downwardly, thereby engaging the clutch C2 by the oil pressure which is supplied from the oil passage 1B, shuttle valve 302, flow-rate control valve 303 with check valve and the oil passage 1P. Meanwhile, the line pressure is supplied from the oil passage 1C to the lower oil chamber 223 so as to fix the spool 222 of the 1-2 shift valve 220 at the upper position where it serves for speed other than the first speed.

For up-shifting to the fourth speed gear, the computer 600 produces an output which serves to de-energize the second solenoid valve S2 so that the solenoid pressure which has been supplied from the oil passage 1H to the upper oil chamber 243 of the 3-4 shift valve 240 is returned to the high level, thus allowing the spool 242 of the 3-4 shift valve 240 to be moved downwardly. As a result, the oil passage 1F is drained, while the oil passage 1D is supplied with the pressurized oil, so that the flow-rate control valve 305 with check valve is supplied with the pressurized oil through the oil passage 1G, whereby the clutch C0 is disengaged and the brake B0 engaged, thus accomplishing the up-shift to the fourth speed gear.

When Manual Valve 210 Selects S Range

In this case, the line pressure is supplied not only to the oil passage 2 but also to the oil passage 3, as will be seen from Table 2, and the up-shift from the first speed gear to the second and third speed gears is conducted in the same manner as that in the case of the D range. However, up-shift to the fourth speed gear is prevented because the spool 242 of the 3-4 shift valve 240 is held at the upper position by the line pressure which is supplied to the lower oil chamber 244 of the 3-4 shift valve 240 from the oil passage 1 or the oil passage 3 through the 2-3 shift valve 230 and the oil passage 1A. When the second speed gear is selected, the line pressure is supplied to the servomotors of the clutches C0 and C1 and to the servomotor of the brake B2 as in the case of the D range. In addition, the line pressure is supplied also to the intermediate coast modulator valve 245 from the oil passage 3 through the 2-3 shift valve 230, oil passage 3A, 1-2 shift valve 220 and the oil passage 3D, so that pressurized oil of a pressure regulated by the intermediate coast modulator valve 245 is supplied to the oil passage 3B, thereby engaging the brake B1. Thus, the second speed in the S range permits the engine braking effect and affords a greater torque transmission capacity by virtue of the fact that both the brakes B2 and B1 are always held in the engaged state. It is to be understood also that, when the manual valve 210 is operated from the D range to the S range during running at fourth speed gear in the D range, the line pressure is introduced into the lower oil chamber 244 of the 3-4 shift valve 240, thereby effecting down-shift to the third speed gear without delay.

When Manual Valve 210 Selects L Range

In this case, the line pressure is supplied to the oil passages 2, 3 and 4 as will be seen from Table 2. The up-shift from the first speed gear to the second speed gear is conducted in the same manner as that in the D range but the up-shift to the third speed gear is prevented because the spool 232 of the 2-3 shift valve 230 is fixed at the upper position by the line pressure introduced into the lower oil chamber 233 of the 2-3 shift valve 230 from the oil passage 4. When the first speed gear is selected, the oil pressure is transmitted to the servomotor B-3 from the oil passage 4 through the 2-3 shift valve 230, oil passage 4A, low coast modulator valve 250, oil passage 4B, 1-2 shift valve 220 and the oil passage 5C, so that the brake B3 is held in the engaged state thereby allowing engine braking effect. When the second speed gear is selected, the operation is identical to that followed when the manual valve 210 selects the S range. It is to be understood also that, when the manual shift valve 230 is shifted to the L range during running with the third speed gear in the S range, down-shift to the second speed gear is effected without delay by the introduction of the line pressure into the lower oil chamber 233 of the 2-3 shift valve 230. Then, when the vehicle decelerates to a predetermined speed, the computer 600 produces an output for energizing the second solenoid valve S2, thereby effecting a down-shift from the second speed gear to the first speed gear.

When Manual Valve 210 Selects R Range

In this case, the pressure exists in the oil passage 5, while the oil passages 2, 3 and 4 are drained, as will be understood from Table 2. Since no pressure exists in the oil passages 2 and 3 leading to the servomotors of the clutch C1 and the brakes B1, B2, the clutch C1 and the brakes B1, B2 are released. The oil pressure supplied to the oil passage 5 is transmitted to the servomotor C-2 through the shuttle valve 302, flow-rate control valve 303 with check valve and the oil passage 1P, so that the clutch C2 is engaged. At the same time, the spool 222 of the 1-2 shift valve 220 is held in the upper position because the line pressure is supplied to the lower oil chamber 223 of this valve through the oil passage 1C, so that the line pressure is supplied to the oil passage 5C thereby engaging the brake B3. Meanwhile, the spool 232 of the 2-3 shift valve 230 is held in the upper position because the solenoid pressure acting in the upper oil chamber 243 of this valve reaches a low level as a result of energization of the first solenoid valve S1. Therefore, the line pressure is introduced from the oil passage 1 to the lower oil chamber 244 of the 3-4 shift valve 240 through the 2-3 shift valve 230 and the oil passage 1A, so that the spool 242 of the 3-4 shift valve is held in the upper position so as to allow the line pressure to be transmitted to the servomotor C-0 from the oil passage 1 through the 3-4 shift valve 240 and the oil passage 1F, thus engaging the clutch C0. At the same time, the oil passage 1D leading to the servomotor B-0 is drained so that the brake B0 is released, thus allowing reversing of the vehicle.

When the manual valve 210 is either in the D or S ranges, the line pressure is transmitted to the oil passage 2. If the spool 222 of the 1-2 shift valve 220 is in the upper position for speed ranges other than first speed, the line pressure is transmitted further to the oil passage 2A and is then introduced into the upper oil chamber 121 of the lock-up relay valve 120 through the oil passage 2D. When the line pressure exists in the upper oil chamber 121, if the third solenoid valve S3 is energized in response to the output from the computer 600 so as to maintain the pressure in the upper oil chamber 121 at the high level, the spool 122 of the lock-up relay valve 120 is moved downwardly, thereby bringing the oil passage 1Q into communication with the oil passage 6B. Consequently, the direct clutch 16 in the torque converter T is engaged, thereby switching the torque converter T into the direct-coupling state.

In contrast, if the line pressure does not exist in the oil passage 2A or if the solenoid pressure of the low level exists in the upper oil chamber 121 because of de-energization of the third solenoid valve S3 by the output of the computer 600, the spool 122 is held in the upper position by the force produced by the line pressure introduced into the lower oil chamber 124 from the oil passage 1. In this state, the oil passage 1Q is held in communication with the oil passage 1R, so that the direct clutch 16 in the torque converter T is held in the disengaged state.

When the spool 122 is held in the upper position, i.e., when the torque converter T is not locked up, the secondary line pressure (torque converter pressure) supplied from the torque converter T to the oil passage 1S is supplied to the oil cooler O/C through the lock-up relay valve 120 and the oil passage 1T. In contrast, when the spool 122 is held in the lower position, i.e., when the torque converter is locked up, the pressurized oil is supplied to the oil cooler O/C from the oil passage 1Q through the orifice 127 in the sleeve 125 and the oil passage 1T and also from the oil passage 1 through the orifice 126 in the sleeve 125 of the lock-up relay valve 120 and the oil passages 1U and 1T.

Figure 4:
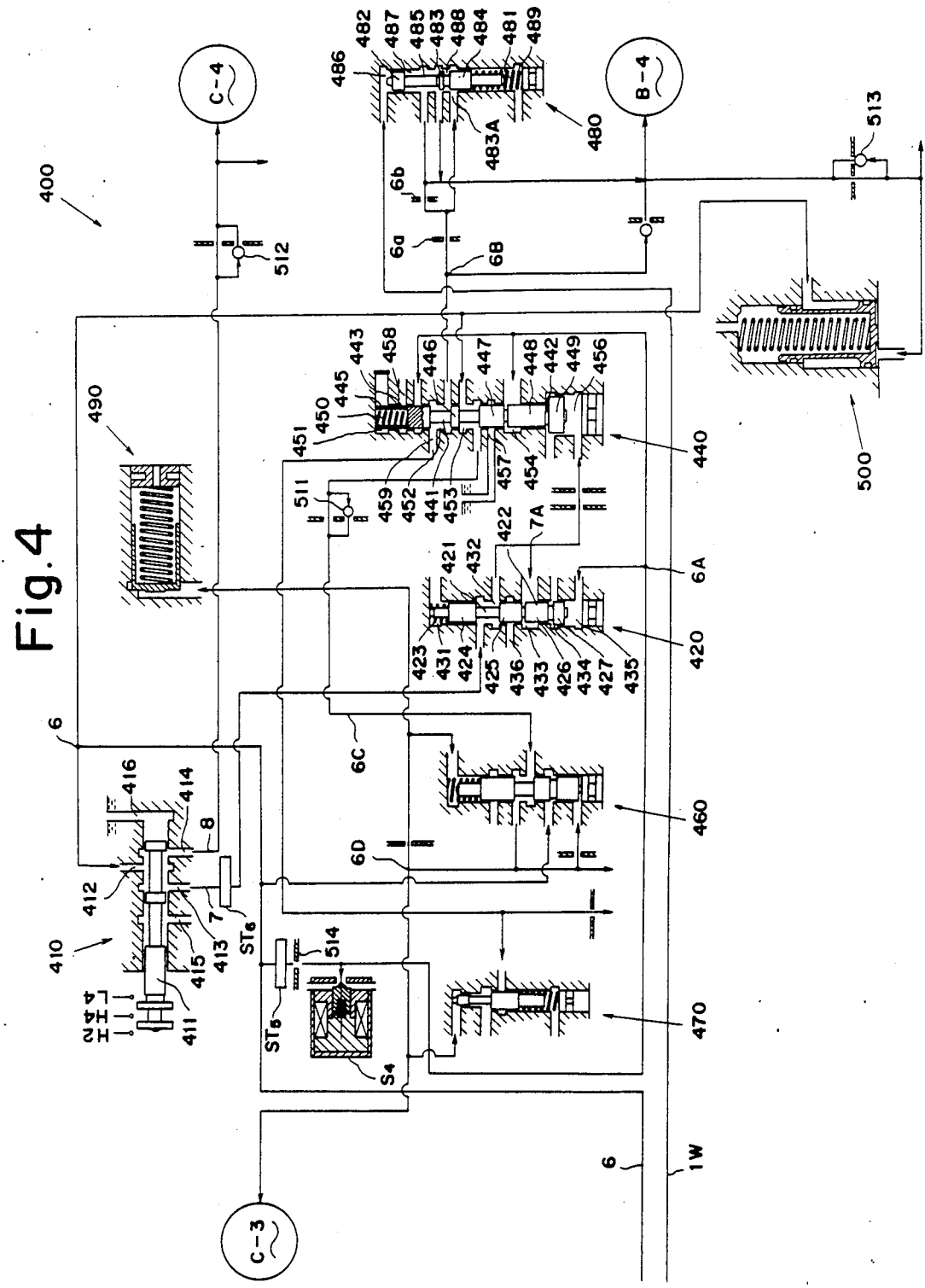
FIG. 4 is a diagram showing a hydraulic circuit for a hydraulic controller used in the sub transmission in accordance with the present invention.

FIG. 4 shows the detail of the sub hydraulic controller 400 for controlling the four-wheel drive sub transmission 50.

The sub hydraulic controller 400 is constituted by the following major parts: a transfer manual valve 410 operated manually by means of a shift lever provided in the vicinity of the driver's seat and adapted to distribute the pressurized oil supplied through the oil passage 6 of the main hydraulic controller 100 both to the oil passages 7 and 8; a relay valve 420; an inhibitor valve 440 for switching the states of engagement of the clutch C3 and the brake B4; a third accummulator control valve 460; a shift timing valve 470; and orifice control valve 480 for smoothing the engagement of the brake B4 and accummulator 490 for smoothing the engagement of the clutch C3; and accummulator 500 for smoothing the engagement of the brake B4, hydraulic servomotors C-3, C-4 and B-4 of the clutches C3, C4 and the brake B4; flow-rate control valves 511, 512 and 513 provided with check valves and adapted to control the flow rates of the pressurized oil flowing therethrough; oil strainers ST5 and ST6; a fourth solenoid valve S4 adapted to be selectively operated by an output from the computer 600; and oil passages providing communication between respective valves and servo cylinders of respective clutches and brakes.

The transfer manual valve 410 has a spool 411 which is directly connected to a shift lever (not shown) provided in the vicinity of the driver's seat. The transfer manual valve 410 also has an in-port 412 communicating with the oil passage 6 of the main hydraulic controller 100 for the main transmission 10, an out-port 413 communicating with the oil passage 7, an out-port 414 communicating with the oil passage 8, and drain ports 415 and 416. When the spool 411 of the transfer manual valve 410 is held in a two-wheel drive direct coupling (H2) position, the oil passage 6 is communicated with the oil passage 7, while the oil passage 8 is communicated with the drain port 416. When the spool 411 is held in a four-wheel drive direct coupling (H4) position, the oil passage 6 communicates with both the oil passage 7 and the oil passage 8. Finally, when the spool 411 is held in a reduced speed four-wheel drive (L4) position, the oil passage 6 is communicated with the oil passage 8, while the oil passage 7 is drained through the drain port 415.

The relay valve 420 has a spool 421 and a plunger 422 arranged in series with the spool 421. The spool 421 has lands 424 and 425 of an equal diameter and arranged at the upper and lower ends thereof, respectively, as viewed in FIG. 4, the upper land 424 being urged by a spring 423. The plunger 422 has an upper land 426 of the same diameter as the lands 424, 425 of the spool 421 and a lower land 427 of a diameter greater than the diameter of the upper land 426. The spool 421 and the plunger 422 in cooperation define an upper oil chamber 431 on the upper side of the upper land 424, a first intermediate oil chamber 432 between the upper land 424 and the lower land 425, a second intermediate oil chamber 433 between the spool 421 and the plunger 422, a third intermediate oil chamber 434 between the upper land 426 and the lower land 427, and a lower oil chamber 435 on the lower side of the lower land 427.

The operation of the relay valve 420 is as follows. Whe the pressurized oil is supplied to the lower oil chamber 435 from the oil passage 6A, the spool 421 and the plunger 422 are displaced upwardly, so that the oil passage 7 is brought into communication with the line pressure supply passage 7A through the first intermediate oil chamber 432, so that the supply and discharge of the line pressure to and from the lower oil chamber 456 of the inhibitor valve 440 is possible through the switching of the transfer manual valve 410. When the line pressure is supplied to the lower oil chamber 456 of the inhibitor valve 440 through the transfer manual valve 410 while the oil passage 7 is communicated with the line pressure supply passage 7A, the feedback pressure is supplied to the second intermediate oil chamber 433 so that the spool 421 is fixed at the upper position. In this state, if the solenoid valve S4 is energized in response to the output from the computer 600 so as to allow the lower oil chamber 435 to be drained, the plunger 422 alone is moved to the lower position, while the spool 421 remains in the upper position, so as to maintain the supply of the line pressure to the lower oil chamber 456 of the inhibitor valve 440. If the line pressure in the oil passage 7 is relieved through the transfer manual valve 410 in this state, or if the lower oil chamber 435 of the relay valve 420 is drained as a result of energization of the fourth solenoid valve S4 by the output from the computer 600 while the line pressure in the lower oil chamber 456 of the inhibitor valve 440 is being drained through the transfer manual valve 410 which provides communication between the oil passage 7 and the line pressure supply passage 7A, the spool 421 and the plunger 423 are displaced downwardly by the forth produced by the spring 423 so as to bring the line pressure supply passage 7A into communication with the drain port 436 through the first intermediate oil chamber 432. When the spool 421 is held in the lower position, the supply and discharge of the line pressure to and from the lower oil chamber 456 of the inhibitor valve 440 through the transfer manual valve 410 does not proceed, so that the spool 441 and the plunger 442 of the inhibitor valve 440 are held in the lower positions as viewed in FIG. 4.

The inhibitor valve 440 has a spool 441 which is adapted to be moved between a first position which is on the lower side as viewed in FIG. 4 and a second position which is on the upper side as viewed in FIG. 4. The spool 441 serves as a change-over valve which conducts supply and discharge of the line pressure to and from the servomotors C-3 and B-4 of the clutch C3 and the brake B4 as it is moved between a lower first position and an upper second position. The inhibitor valve 440 also has a plunger 442 disposed in series with the spool 441 and adapted to be moved between a lower first position and an upper second position. The plunger 442, when in the upper second position, holds the spool 441 in the second position. The spool 441 has an upper sleeve-like land 445, a lower land 447 and intermediate land 446 all having an equal diameter, and a spring 450 acting on the upper land 445 thus serving as means for setting the spool 441 in the first position. On the other hand, the plunger 442 has an upper land 448 of the same diameter as lands of the spool 441, and a lower land 449 having a greater diameter than the upper land 448. Thus, the spool 441 and the plunger 442 define an upper oil chamber 451 on the upper side of the sleeve-like land 445, a first intermediate oil chamber 452 between the sleeve-like land 445 and the intermediate land 446, a second intermediate oil chamber 453 between the intermediate land 446 and the lower land 447, an oil chamber 454 between the spool 441 and the plunger 442, and a lower oil chamber 456.

The operation of this inhibitor valve 440 is as follows. When the spool 441 is held in the lower position, i.e., the first position, the upper oil chamber 451 is communicated with the oil passage 6A through an oil port 443 in the sleeve-like land 445, while the first intermediate oil chamber 452 and the second intermediate oil chamber 453 provide, respectively, communication between the line pressure passage 6 and a speed-reduction oil passage 6B and between a direct-coupling oil pasage 6c and a drain port 457.

Conversely, when the spool 441 is held in the upper position, i.e., the second position, the upper oil chamber 451 is communicated with a drain port 458 through the oil port 443 formed in the sleeve-like land 445, while the first intermediate oil chamber 452 and the second intermediate oil chamber 453 provide, respectively, communication between the speed-reduction oil passage 6B and a drain port 459 and between the oil passage 6 and the direct-coupling oil passage 6C. On the other hand, the oil chamber 454 is communicated with an oil passage 6A which delivers oil pressure corresponding in degree to the signal supplied to the fourth solenoid valve S4. This oil pressure acting in the oil chamber 454 serves to normally bias the spool 441 to the second position, i.e., the upper position, while urging the plunger 442 to the first position, i.e., the lower position. An oil pressure maintained in the lower oil chamber 456 serves to normally maintain the plunger 442 in the second position, i.e., in the upper position.

The orifice control valve 480 is a control valve which regulates the pressure of the working oil supplied to the oil passage 6B and delivers the regulated pressure to the hydraulic servomotor B-4. The orifice control valve 480 has a spool 485 which is biased upwardly by a spring 481. The spool 485 has an upper land 482, an intermediate land 483 and a lower land 484. The orifice control valve 480 has an upper oil chamber 486 on the upper side of the upper land 482, an upper intermediate oil chamber 487 between the upper land 482 and the intermediate land 483, a lower intermediate oil chamber 488 between the intermediate land 483 and the lower land 484, anbd a lower oil chamber 489 accommodating the spring 481. The spool 485 has an orifice 483A through which the upper intermediate oil chamber 487 is communicated with the lower intermediate oil chamber 488.

The upper oil chamber 486 is communicated with the oil passage 1W in the main hydraulic controller 100. The position of the spool 485 is changed in accordance with the balance between the force exerted by the spring 481 and the force produced by an oil pressure corresponding to the throttle opening and applied to the upper oil chamber 486, so as to deliver the line pressure in the oil passage 6B to the hydraulic servomotor B-4 while selectively making orifices 6a and 6b in the oil passage 6B effective.

The fourth solenoid valve S4 is controlled by the computer 600 such that it is switchable from the de-energized state to the energized state on conditions that the shift lever (not shown) is in the L4 (reduced-speed four-wheel drive) range and that the state of running of the vehicle meets a predetermined condition, and from the energized state to the de-energized state on condition that the shift lever is in the H2 (two-wheel drive direct coupling) or H4 (four-wheel drive direct coupling) ranges and that the state of running of the vehicle meets a predetermined condition. When de-energized, the fourth solenoid valve S4 acts to establish a solenoid pressure of high level equal to that of the line pressure in the oil passage 6A which communicates with the oil passage 2 through the orifice 514, whereas, when energized, it acts to drain the oil passage 6A, thereby generating a solenoid pressure of low level.

As stated before, the transfer manual valve 410 is operated by means of the shift lever of the sub transmission 50 provided in the vicinity of the driver's seat. This shift lever has sub shift positions Sp corresponding to the respective ranges of H2 (two-wheel drive direct coupling), L2 (reduced-speed two-wheel drive), H4 (four-wheel drive direct coupling) and L4 (reduced-speed four-wheel drive). The states of the brake B4 and the clutches C3 and C4, as well as the states of running of the vehicle, are shown in Table 3 in relation to respective ranges of the sub shift positions Sp.

TABLE 3

| Sp | S4 | C3 | B4 | C4 | Running mode |
|----|----|----|----|----|--------------|
| H2 | O | X | E | X | L2 |
|    | α | E | X | X | H2 |
| H4 | O | X | E | E | L4 |
|    | α | E | X | E | H4 |
| L4 | X | E | X | E | H4 |
|    | β | X | E | E | L4 |

In Table 3, a symbol α represents the fact that, once the solenoid valve S4 is de-energized, the direct coupling condition is maintained even if the solenoid valve S4 is energized thereafter, whereas a symbol β represents the fact that, once the solenoid valve S4 is energized, the reduced-speed coupling condition is maintained even if the solenoid valve S4 is de-energized thereafter. A symbol E represents the fact that the clutch or the brake is held in the engaged state, while X represents the fact that the clutch or the brake is in the disengaged or released state.

Table 4 shows the respective states of communication between the oil passage 6 and the oil passges 7 and 8, in respective shift ranges of the sub transmission.

TABLE 4

|  | H2 | H4 | L4 |
|---|----|----|----|
| Oil passage 7 | O | O | X |
| Oil passage 8 | X | O | O |

In Table 4, the mark represents the fact that the oil passage is supplied with the line pressure, while the mark X represents the fact that the oil passage is drained.

The operations of the sub transmission 50 in respective ranges are as follows.

(A) When Transfer Manual Valve 410 Selects H2 Range

In this case, the oil passage 7 is supplied with the line pressure, while the oil passage 8 is drained. In consequence, the hydraulic servomotor C-4 is drained so as to disengage the clutch C4. In this state, the power of the engine is not transmitted to the sleeve 53, so that the vehicle runs in the two-wheel drive mode.

When the fourth solenoid valve S4 is de-energized in accordance with the output from the computer 600, the lower oil chamber 435 of the relay valve 420 is supplied with the solenoid pressure of high level, so that the spool relay 421 and the relay plunger 422 are held in the upper positions as viewed in the drawing, whereby the oil passage 7 and the line pressure supply passage 7A are communicated with each other through the relay valve 420, thereby allowing the line pressure signal to be applied to the lower oil chamber 456 of the inhibitor valve 440. In consequence, the spool 441 and the plunger 442 of the inhibitor valve 440 are held in the second positions, i.e., upper positions, so that the oil passage 6B and, hence, the hydraulic servomotor B-4 are drained to release the brake B4. Since the spool 441 and the plunger 442 of the low-high 440 are held in the second upper positions, the oil passage 6C is communicated with the oil passage 6 and, hence, with the oil passage 6D through the third accummulator control valve 460, thereby supplying the line pressure to the hydraulic servomotor C-3 and thus engaging the clutch C3. The sub transmission 50 therefore operates in the H2 (two-wheel drive direct coupling) range.

In this state, the spool 421 is fixed in the upper position by virtue of the line pressure fed back from the line pressure supply passage 7A to the second intermediate oil chamber 433 of the relay valve 435. Therefore, even if the fourth solenoid valve S4 is energized to supply the solenoid pressure of the low level to the lower oil chamber 435, the plunger 422 alone is moved to the lower position while the spool 421 remains in the upper position, thus maintaining the supply of the line pressure signal to the lower oil chamber 456 of the inhibitor valve 440. Thus, the sub transmission 50 is maintained in the H2 (two-wheel drive direct-coupling) range, even though the fourth solenoid valve S4 is energized.

(B) When Transfer Manual Valve 410 Selects H4 Range

In this case, the line pressure is supplied both to the oil passages 7 and 8. When the fourth solenoid valve S4 is de-energized in response to the output of the computer 600, the solenoid pressure of high level is supplied to the lower oil chamber 435 of the relay valve 435, so that the spool 421 and the plunger 422 are held in the upper positions so as to provide communication between the oil passage 7 and the line pressure supply passage 7A, thereby allowing the line pressure to be supplied to the lower oil chamber 456 of the inhibitor valve 440. Consequently, the spool 441 and the plunger 442 of the inhibitor valve 440 are held in the second positions, i.e., upper positions, so that the oil passage 6B and, hence, the hydraulic servomotor B-4 are drained through the drain port 459, thereby releasing the brake B4.

Meanwhile, the oil passage 6C is held in communication with the oil passage 6 because the spool 441 and the plunger 442 other of the inhibitor valve 440 are held in the second or upper positions. The oil passage 6C is communicated also with the oil passage 6D through the third accummulator control valve 460. Therefore, the line pressure is supplied to the hydraulic servomotor C-3, thereby engaging the clutch C3. On the other hand, the line pressure supplied to the oil passage 8 is introduced into the hydraulic servomotor C-4, thereby engaging the clutch C4, and thus allowing the sub transmission 50 to operate in the H4 (four-wheel drive direct-coupling) range.

In this state, the line pressure is fed back to the second intermediate oil chamber 433 of the relay valve 420 from the line pressure supply passage 7A, so that the spool 421 is fixed in the upper position. When the fourth solenoid valve S4 is energized in this state, the plunger 422 alone is moved downwardly, while the spool 421 remains in the upper position, thereby maintaining the supply of the line pressure to the lower oil chamber 456 of the inhibitor valve 440 and, hence, the H4 (four-wheel drive direct-coupling) range of the sub transmission 50.

(C) When Transfer Manual Valve 410 Selects L4 Range

In this case, the oil passage 7 is drained, while the oil passage 8 is supplied with the line pressure, as will be seen from Table 4. Thus, the oil passages 7 and 7A are drained, while the oil passage 8 is supplied with the line pressure, regardless of the position of the relay valve 420, so that the clutch C4 is engaged to maintain the four-wheel drive mode of the sub transmission 50.

When the transfer manual valve 410 is shifted from the high speed range H2 or H4 down to the low speed range L4, if the fourth solenoid valve S4 is de-energized in response to the output from the computer 600, the solenoid pressure of high level is supplied from the oil passag 6A to the oil chamber 454 of the inhibitor valve 440, while the line pressure which has been supplied to the lower oil chamber 456 of the same valve is drained through the oil passage 7A, relay valve 420, oil passage 7 and the transfer manual valve 410. In consequence, the plunger 442 of the inhibitor valve 440 is moved to the first or lower position, but the spool 441 of the same valve remains in the second or upper position so as to maintain the H4 (four-wheel drive direct-coupling) range of the sub transmission 50.

If the fourth solenoid valve S4 has been energized in response to the output of the computer 600 when the transfer manual valve 410 is shifted to the L4 range, or if the fourth solenoid valve S4 is switched from the de-energized state to the energized state while the transfer manual valve 410 has been set in the L4 range, the solenoid pressure supplied to the oil passage 6A is changed to the low level, so that the spool 441 of the inhibitor valve 440 is set in the first or lower position by the force of the spring 450. As a result, the oil passage 6B is brought into communication with the oil passage 6, so that the hydraulic servomotor B-4 is supplied with the line pressure through the orifice 6a, orifice 6b or the orifice control valve 480, thereby engaging the brake B4. On the other hand, the oil passage 6C is communicated with the drain port 457 through the first intermediate oil chamber 452, so that the hydraulic servomotor C-3 is drained so as to disengage the clutch C3, thereby shifting the sub transmission 50 to L4 (reduced-speed four-wheel drive) range. Once the L4 range is attained, the spool 441 of the inhibitor valve 440 is not moved even if the fourth solenoid valve S4 is de-energized, because the solenoid pressure of high level established in the oil passage 6A is supplied not only to the oil chamber 454 of the inhibitor valve 440 but also to the upper oil chamber 451 of the same valve through the oil port 443 in the sleeve-like land 445 of the spool 441, so that the sub transmission 50 is maintained in the L4 (reduced-speed four-wheel drive) range.

(D) When Transfer Manual Valve 410 is Shifted to H2 or H4 Range From L4 Range While Sub Transmission 50 is in Reduced-Speed Four-Wheel Driving Range In this case, if the fourth solenoid valve S4 has been energized by the output from the computer 600, the lower oil chamber 435 of the relay valve 420 is drained so that the spool 421 and the plunger 422 are held as a unit in the lower positions by the force of the spring 423. Therefore, the communication between the oil passage 7 and the oil passage 7A is interrupted by the upper land 424 and the lower oil chamber 456 of the inhibitor valve 440 is drained. In consequence, the spool 441 and the plunger 442 of the inhibitor valve 440 are held in the lower position by the force of the spring 450. As a result, the clutch C3 is released while the brake B4 is engaged, so that the sub transmission 50 is held in L2 (reduced-speed two-wheel drive) or L4 (reduced-speed four-wheel drive) range.

However, when the fourth solenoid valve S4 is de-energized by the output of the computer 600, the solenoid pressure of high level is introduced into the lower oil chamber 435 of the relay valve 420 as stated before, so that the spool 421 and the plunger 422 of the relay valve 420 are moved to the upper positions so as to provide communication between the oil passage 7 and the line pressure supply passage 7A. This in turn permits the line pressure to be supplied to the lower oil chamber 456 of the inhibitor valve 440, so that the spool 441 and the plunger 442 are moved to and held in the second or upper positions. As a result, the oil passage 6B is brought into communication with the drain port 459 and, hence, drained, so as to release the brake B4. Meanwhile, the oil passage 6C is communicated with the oil passage 6 because the spool 441 and the plunger 442 are held in the upper positions. In consequence, the oil passage 6 is brought into communication with the oil passage 6D through the third accummulator control valve 460, so that the clutch C3 is engaged to changeover the sub transmission 50 to the H2 (two-wheel drive direct coupling) range or H4 (four-wheel drive direct-coupling) range.

Figure 5:
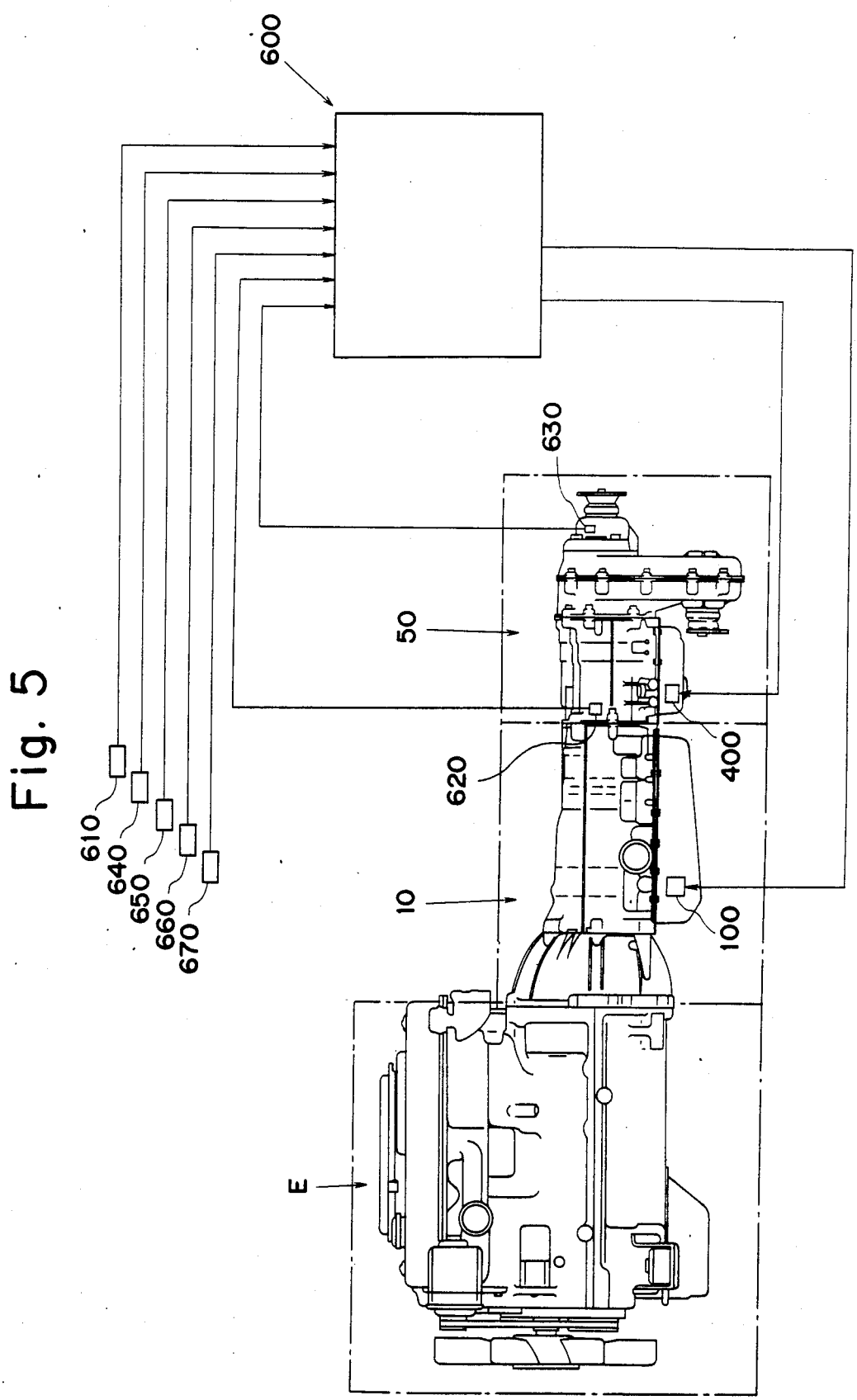
FIGS. 5 and 6 are respectively block diagrams of a computer used for the transmission system in accordance with the present invention.
Figure 6:
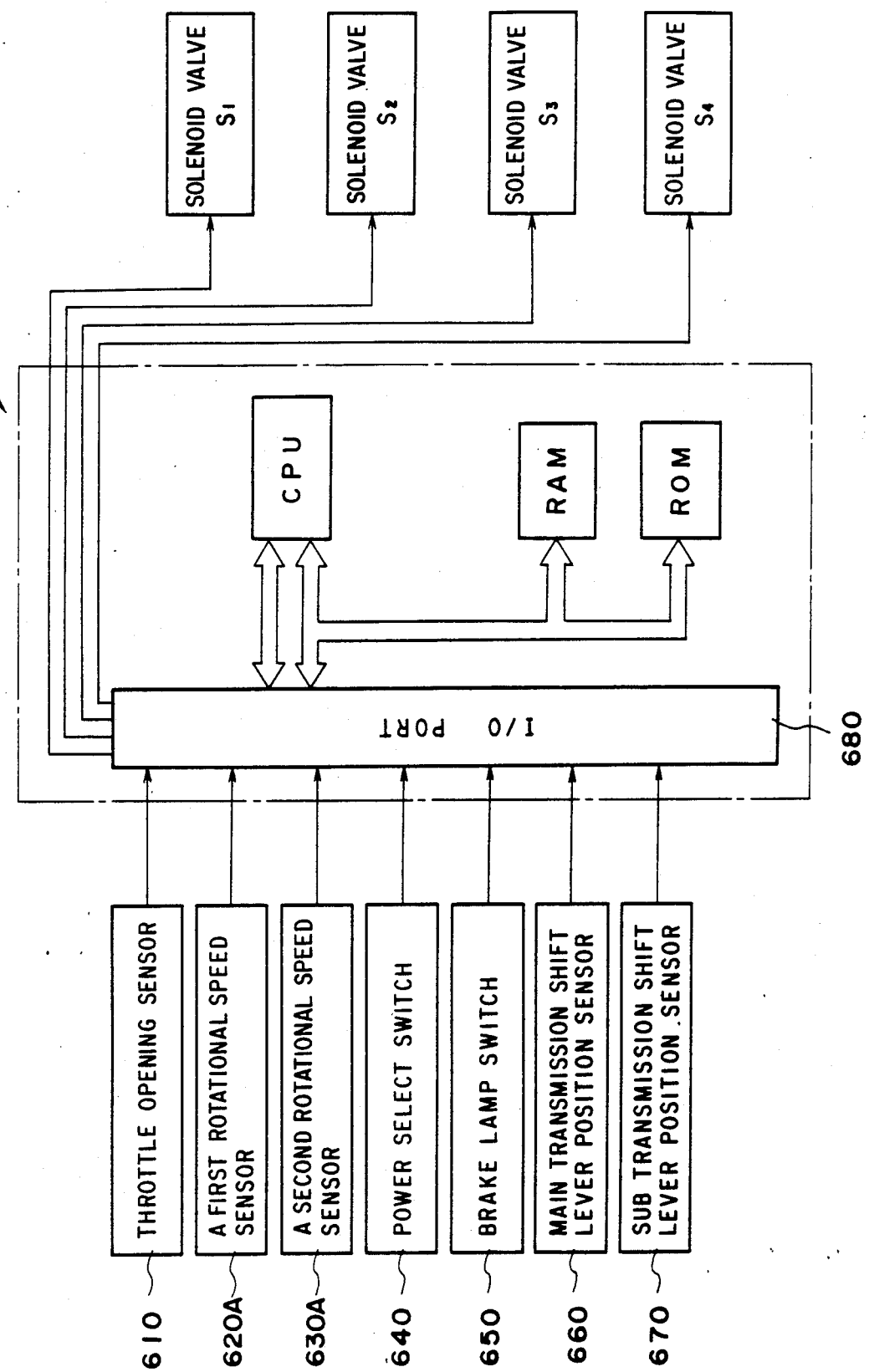

Description will be made below of a computer which conducts the shift control of the four-wheel drive main transmission with reference to the block diagrams as shown in FIGS. 5 and 6.

A computer 600 for controlling the amount of power supplied to the solenoid valves S1, S2, S3 and S4 which are incorporated in the main hydraulic controller 100 and the sub hydraulic controller 400. The computer 600 has the following major parts: a throttle opening sensor 610 for detecting the amount of depression of the accelerator pedal; a first rotational speed sensor 620A for detecting pulses generated by the read switch 42 of a first rotational speed detecting means 620; a second rotational speed sensor 630A for detecting pulses generated by the reed switch 65 of a second rotational speed detecting means 630; a power select switch 640 for effecting changeover between shift patterns such as ECONOMY, NORMAL and POWER in accordance with the selection performed by the driver; a brake lamp switch 650; a main transmission shift lever position sensor 660 for detecting the position Mp of the shift lever which sets the range of the main transmission 10; a sub transmission shift lever position sensor 670 for detecting the position (Sp) of the the shift lever which sets the range of the sub transmission 50; an I/O port 680 which allows inputs to be made which correspond to the various factors representing the vehicle running state and also allows outputs to be supplied to the solenoid valves S1 to S4; a central processing unit CPU; a random access memory RAM for shift point processing; and a read-only memory for storing shift pattern data such as shift points and lock-up points.

Figure 7:
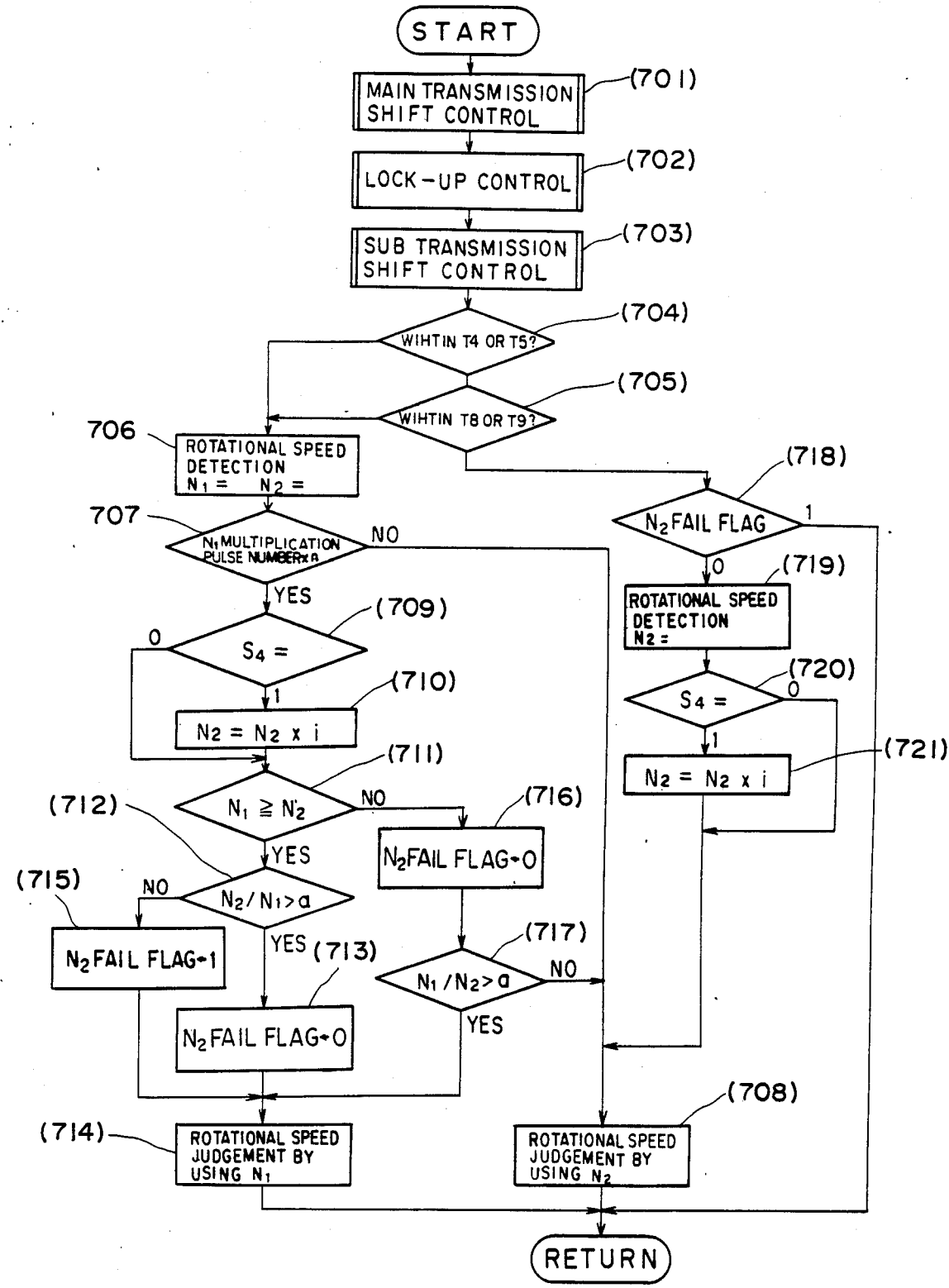
FIG. 7 is a flow chart showing the operation of the shift control mechanism in accordance with the present invention.

Description will be made below of shift control with reference to the flowchart as shown in FIG. 7.

The ignition switch of a vehicle (not shown) is turned "ON" to start the engine E of the vehicle.

On the basis of the various factors representing the vehicle running state, the shift control of the main transmission 10 is effected by energizing and de-energizing the solenoid valves S1 and S2 of the main hydraulic controller 100 (Step 701). The engagement control of the direct-coupling clutch 16 is effected by energizing and de-energizing the solenoid valve S3 of the main hydraulic controller 100 (Step 702). The shift control of the sub transmission 50 is effected by energizing and de-energizing the solenoid valve S4 of the sub hydraulic controller 400 (Step 703). Judgement is made (Step 704) as to whether or not a set period T4 or a set period T5 has elapsed; the set period T4 represents the period of time during which the solenoid valve S4 starts to be energized and the speed range of the sub transmission 50 is completely shifted from the direct-coupling mode to the reduced-speed mode while the set period T5 represents the period of time during which the solenoid valve S4 starts to be de-energized and the speed range of the sub transmission 50 is completely shifted from the reduced-speed mode to the direct-coupling mode. If YES (during the set period T4 or T5), judgement is made (Step 705) as to whether or not a set period T8 or a set period T9 has elapsed; the set period T8 represents the period of time during which the solenoid valve S4 starts to be energized and the spool 441 of the inhibitor valve 440 thereby starts to move downwardly, as viewed in the figures while the set period T9 represents the period of time during which the solenoid valve S4 starts to be de-energized and the spool 441 of the inhibitor 440 starts to move upwardly, as viewed in the figures (Step 705). If the decision made in Step 704 is NO (during any period of time other than the set periods T4 and T5), or if the decision made in Step 705 is YES (during a set period T8 or T9), the spool 441 of the inhibitor 440 is displaced upwardly or downwardly, as viewed in the figures, so that it is determined that the transmission system is not in a transient speed changing state. Consequently, the first rotational speed sensor 620A and the second rotational speed sensor 630A conduct the reading of a rotational speed N1 of the output shaft 32 of the main transmission 10 and a rotational speed N2 of the first output shaft 52 of the sub transmission 50 (Step 706). Next, judgement is made (Step 707) as to whether or not a value obtained through the multiplication of the rotational speed N1 by a given value such as 4 is greater than the then rotational speed n (n: the average number of pulses) (Step 707). If the decision made in Step 707 is NO (when the rotational speed N1 thus multiplied is less than the then rotational speed n), it is determined that the value detected by the first rotational speed sensor 620A is not accurate, and then, calculation is made (708) as to the rotational speed of the output of the main transmission 10 on the basis of the rotational speed N2 of the first output shaft 52 of the sub transmission 50 delivered by the second rotational speed sensor 630A, and subsequently, the process is repeated. If the decision made in Step 707 is YES (when the rotational speed N1 thus multiplied is greater than the then rotational speed n), judgement is made (Step 709) as to whether the solenoid valve S4 is in an energized state (indicated by the numeral "1") or in a de-energized state (indicated by the numeral "0") in order to detect the speed range of the sub transmission 50. If "1" is the answer (i.e., in a case where the solenoid valve S4 is in an energized state), it is determined that the sub transmission 50 is in the reduced-speed mode, and the second rotational speed N2 of the first output shaft 52 read by the second rotational speed sensor 630A is replaced with a value obtained from the rotational speed N2 × a gear ratio i in the reduced-speed mode of the sub transmission 50{1+1/(the number of teeth of the sun gear 56/the number of teeth of the ring gear 58)(Step 710), and the process then proceeds to Step 711. If "0" is the answer (when the solenoid valve S4 is in a de-energized state), it is judged that the sub transmission 50 is set in a direct-coupling mode (a gear ratio 1), and the process then proceeds to Step 711. Judgement is made (Step 711) as to whether or not the rotational speed N1 of the output shaft 32 of the main transmission 10 read by the first rotational speed sensor 620A is greater than the rotational speed N2. If YES (in the case of the rotational speed N1 ≧ the rotational speed N2), judgement is made (Step 712) as to whether or not the rotational speed N2/the rotational speed N1 is greater than a certain set value a. If YES (in the case of the rotational speed N2/the rotational speed N1>a), it is determined that the rotational speed N2 delivered by the second rotational speed sensor 630A shows a normal value, and a second sensor fail flag becomes "0" (Step 713). Subsequently, culculation is made (Step 714) as to the rotational speed of the output of the main transmission 10 on the basis of the rotational speed N1 of the output shaft 32 of the main transmission 10 delivered by the first rotational speed sensor 620A, and the process is then repreated. If NO (in the case of the rotational speed N2/the rotational speed N1≦a), it is determined that the rotational speed N2 delivered by the second rotational sensor 630A does not show a normal value, and thus, a second rotational speed sensor fail flag becomes "1" (Step 715). Then, the process proceeds to Step 714. If the decision made in Step 711 is NO (in the case of the rotational speed N1<the rotational speed N2), it is determined that the rotational speed N2 delivered by the second rotational speed sensor 630A shows a normal value, and thus, the second rotational sensor fail flag becomes "0" (Step 716). Subsequently, jugdement is made (Step 717) as to whether the rotational speed N1/the rotational speed N2 is greater than a certain value a. If YES (in the case of the rotational speed N1/the rotational speed N2>a), it is determined that the rotational speed N1 delivered by the first rotational speed sensor 620A shows a normal value, and the process proceeds to Step 714. If NO (in the case of the rotational speed N1/the rotational speed N2≦a), it is judged that the rotational speed N1 delivered by the first rotational sensor 620A does not show a normal value, and the process proceeds to Step 708. If the desicion made in Step 705 is NO (within the set period T4 or the set period T5 and within the set period T8 or the set period T9), it is determined that the sub transmission 50 is in a transient speed changing state and judgement is made (Step 718) as to whether the second rotational speed sensor fail flag is "1" (the flag is up) or "0" (the flag is down). If "1" is the answer (the second rotational speed sensor fail flag is up), it is determined that the second rotational speed sensor 630A is not performing a nornal operation, and the process is repeated. If "0" is the answer of Step 718 (the second sensor rotational speed sensor fail flag is down), the second rotational speed sensor 630A conducts the reading of the rotational speed N2 of the first output shaft 52 of the sub transmission 50 (Step 719). Next, judgement is made (Step 720) as to whether the solenoid valve S4 is in an energized state (indicated by the numeral "1") or in a de-energized state (indicated by the numeral "0") in order to detect the speed range of the sub transmission 50. If "1" is the answer (when the solenoid S4 is in an energized state), it is determined that the speed range of the sub transmission 50 is set in the reduced-speed mode, and the rotational speed N2 of the first output shaft 52 read by the second rotational speed sensor 630A is replaced with the rotational speed N2 X a gear ratio i in the reduced-speed mode of the sub transmission 50 $\{1+1/($ the number of teeth of the sun gear 56/the number of teeth of the ring gear 58$)\}$ (Step 712). Subsequently, the process proceeds to Step 708. If "0" is the answer of Step 720 (when the solenoid S4 is in a de-energized state), it is judged that the speed range of the sub transmission 50 is set in the direct-coupling mode (gear ratio 1), and the process proceeds to Step 708.

Figure 8:
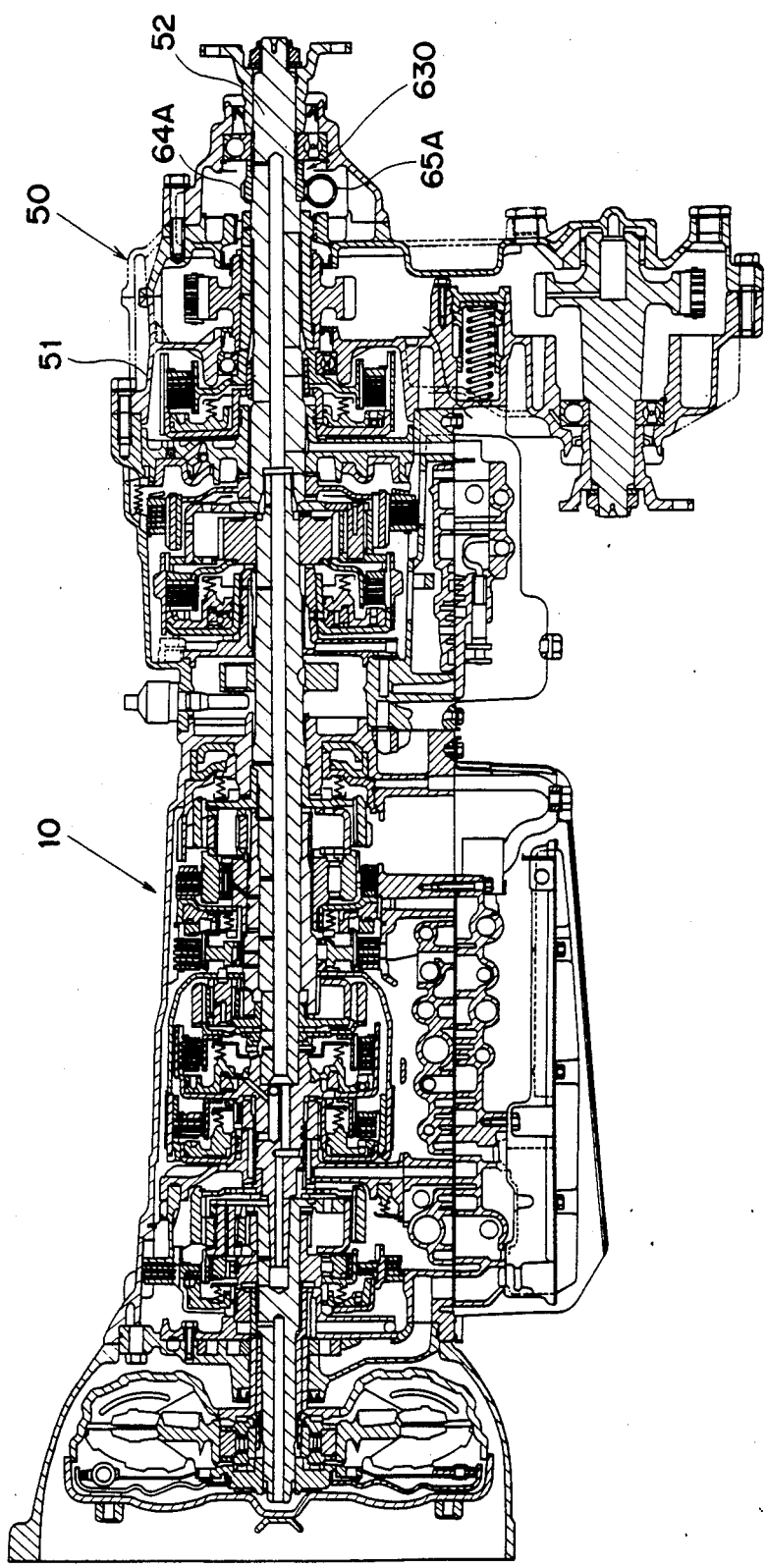
FIG. 8 is a sectional view showing a four-wheel drive transmission which is another preferred embodiment of the present invention.

FIG. 8 is a cross-sectional view of a four-wheel drive transmission showing another preferred embodiment of the present invention.

In the second rotational speed detecting means 630 of the embodiment shown in FIG. 8, the drive gear 64A composed of the worm wheel of a worm gear is mounted on the periphery of the first output shaft 52 which is located at the rear portion of the sub transmission case 51 for the sub transmission 50 without using the rotor 64 and the reed switch 65 shown in the above described embodiment. The drive gear 64A is equipped with a driven gear 65A composed of a worm which is meshed with the drive gear 64A and detects the rotational speed of the first output shaft 52. The arrangement is such that the rotational speed of the first output shaft 52 of the sub transmission 50 is detected in response to the rotational speed of the driven gear 65A which is meshed with the drive gear 64A.

The above described preferred embodiment shows one example wherein the second rotational speed detecting means is employed while the sub transmission is in a speed changing state and the first rotational speed detecting means is employed while the sub transmission is not in a speed changing state. Conversely, the first rotational speed detecting means may be employed while the sub transmission is in speed changing state and the second rotational speed detecting means may be employed while the sub transmission is not in that state.

Also, while the above described embodiment shows one example wherein a transmission system employing a planetary gear is applied to the sub transmission, the present invention may be adapted for other types of speed changing mechanism which employ a plurality of trains of spur gears, stepless speed range gear and so forth.

Additionally, the above described embodiment shows one example of a four-wheel drive transfer having the sub transmission for transmitting power to the front wheels and the rear wheels. However, the present invention is not limited to the four-wheel drive transmission and may be applied to every kind of transmission system having a main transmission (a main speed change mechanism) and a sub transmission (a sub speed change mechanism).

Furthermore, the first rotational speed detecting means may be arranged in such a manner as to detect either the rotational speed of the output shaft of the main transmission or that of the input shaft of the sub transmission.

What we claim is:

1. A transmission control device having selectable rotation speed detecting means for controlling a transmission system having a plurality of speed changing ratios and comprised of a main transmission and a sub transmission connected to the output shaft of the main transmission and wherein the transmission control device comprising:

first rotation speed detecting means associated with the output shaft of the main transmission;

second rotation speed detecting means associated with the output shaft of the sub transmission;

an electronic control means for receiving signals from various sensors for sensing the running state of the vehicle and to determine the speed changing ratio and to generate a control signal for controlling the speed changing mechanisms of the respective transmissions; and a speed changing mechanism driving means for driving said speed changing mechanisms of the main and sub transmissions in accordance with the control signals from the electronic control means, wherein the electronic control means has judging means for determining whether the sub transmission is in the transient period of speed changing operation, and wherein the electronic control means controls, when the sub transmission is in transient period, the speed changing operation in accordance with an output signal from the second rotation speed detecting means.

2. The transmission control device having selectable rotation speed detecting means according to claim 1, wherein the speed changing mechanism driving means comprises a main hydraulic control device having a solenoid valve to selectively engage and disengage frictional engagement elements in accordance with energization and de-energization of the solenoid valve so as to change the speed changing ratio of the main transmission and a sub hydraulic control device having a solenoid valve to selectively engage and disengage frictional engagement elements in accordance with energization and de-energization of the solenoid valve so as to change the speed changing ratio of the sub transmission, and wherein the electronic control means sets the moment of commencement of the speed changing operation and the time required for the completion of the change of the speed changing ratio in accordance with the operation characteristics of the solenoid valve of the sub hydraulic control means, and to judge whether the sub transmission is in transient period by detecting whether the time has elapsed from the moment at which the speed changing operation is commenced.

3. The transmission control device having selectable rotation speed detecting means according to claim 2, wherein the sub hydraulic control means includes a solenoid valve for being driven by a control signal from the electronic control means, and a valve means for selectively switching the supply of pressurized oil to frictional engagement elements in accordance with the energization and de-energization of the solenoid valve, and wherein the electronic control means sets the moment of commencement of the speed changing operation and the time required for the completion of the change of the speed changing ratio in accordance with the operation characteristics of the solenoid valve and the valve means of the sub hydraulic control means, and to judge whether the sub transmission is in transient period by detecting whether the time has elapsed from the moment at which the speed changing operation is commenced.

4. The transmission control device having selectable rotation speed detecting means according to claim 3, wherein at least one of the first and second rotation speed detecting means includes a rotor having a permanent magnet and attached to the output shaft of the transmission, and a lead switch attached to a portion of the transmission case adjacent to the rotor, and wherein the lead switch becomes conductive when approached by the permanent magnet and becomes non-conductive when the permanent magnet has been moved away therefrom, and wherein the lead switch produces a pulse signal representing the rotation speed of the output shaft.

5. The transmission control device having selectable rotation speed detecting means according to claim 3, wherein at least one of the first and second rotation speed detecting means includes a driving worm gear wheel attached to the output shaft of the associated transmission and a driven worm gear meshing with the driving worm gear and mounted on a portion of the transmission case adjacent to the driving gear, and wherein the rotation speed of the driven gear is detected from the rotation speed of the driven gear.

* * * * *